United States Patent [19]
Hillard et al.

[11] Patent Number: 5,548,164
[45] Date of Patent: Aug. 20, 1996

[54] AUTOMOTIVE ADAPTABLE SECURITY MODULE FOR A STARTER SOLENOID

[76] Inventors: John N. Hillard, 251 N. Mountain Trail Ave., Sierra Madre, Calif. 91024; Allan P. McDougall, 742 Mountain View Ave., Monrovia, Calif. 91016

[21] Appl. No.: 957,707

[22] Filed: Oct. 7, 1992

[51] Int. Cl.⁶ .................................................. B60R 25/04
[52] U.S. Cl. ........................................ 307/10.3; 180/287
[58] Field of Search ............................ 307/10.6, 10.3, 307/10.4; 361/172, 171, 728, 730, 752, 725; 180/271, 287; 123/198 DC; 340/426, 427; 70/DIG. 30, 255, 237, 386, 416, 417, 422

[56] References Cited

U.S. PATENT DOCUMENTS

| | | | |
|---|---|---|---|
| 3,634,697 | 1/1972 | MacFarlane | 307/10.4 |
| 3,697,945 | 10/1972 | Comber | 307/10.4 |
| 3,851,504 | 12/1974 | Theobald | 307/10.4 |
| 3,892,976 | 7/1975 | Tsevdos et al. | 307/10.3 |
| 4,209,709 | 6/1980 | Betton | 180/287 |
| 4,533,016 | 8/1985 | Betton | 180/287 |
| 4,645,939 | 2/1987 | Robinson | 307/10.4 |
| 4,733,638 | 3/1988 | Anderson | 180/287 |
| 4,804,856 | 2/1989 | Hanisko et al. | 307/10.2 |
| 4,868,559 | 9/1989 | Pinnow | 340/825.31 |
| 4,993,627 | 2/1991 | Phelan et al. | 235/382 |
| 5,138,986 | 8/1992 | Aguilar | 307/10.4 |
| 5,229,747 | 7/1993 | Zhao | 70/416 |

*Primary Examiner*—A. D. Pellinen
*Assistant Examiner*—Richard T. Elms

[57] ABSTRACT

An anti-theft starter circuit system and electronic circuit security module housing apparatus for use therewith in a motor vehicle having an electrically operable starter motor and solenoid arrangement, the electronic circuit security module housing being mechanically adaptable to and installed directly upon existing starter solenoids, and a system access code entry device within the vehicle operator's compartment.

6 Claims, 16 Drawing Sheets

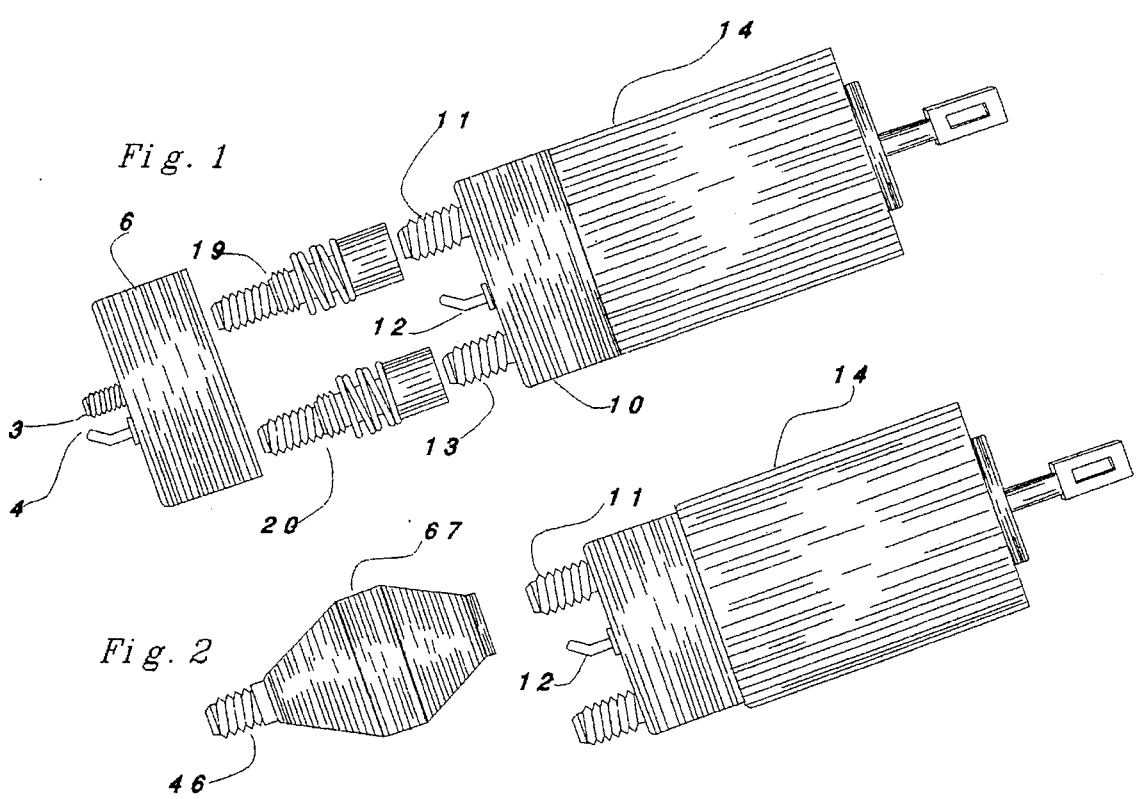

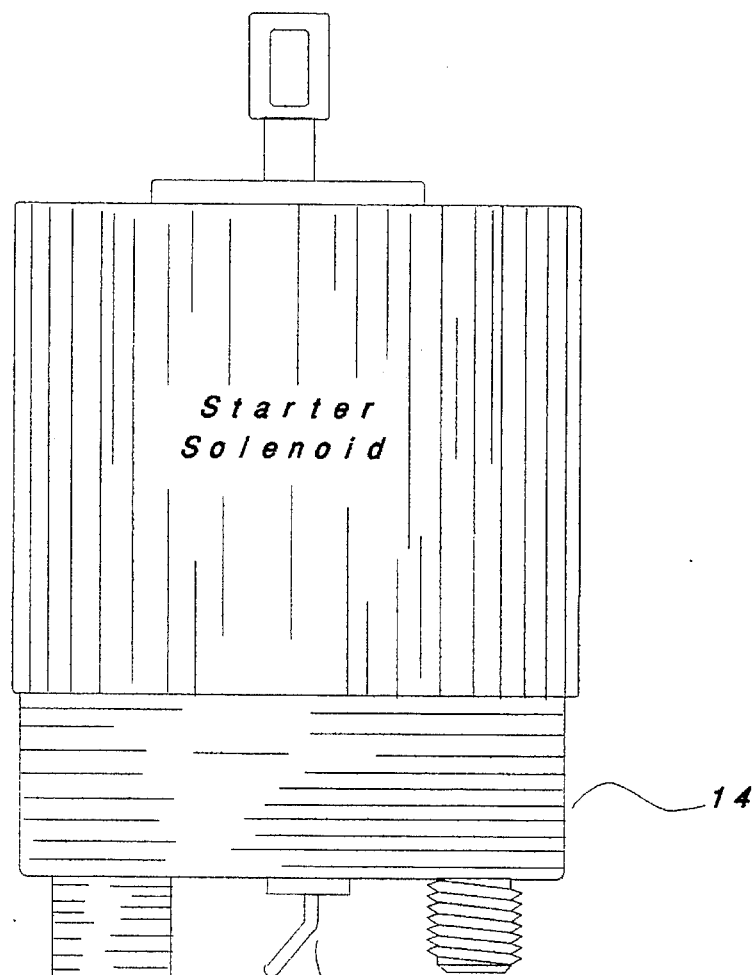
Fig. 10
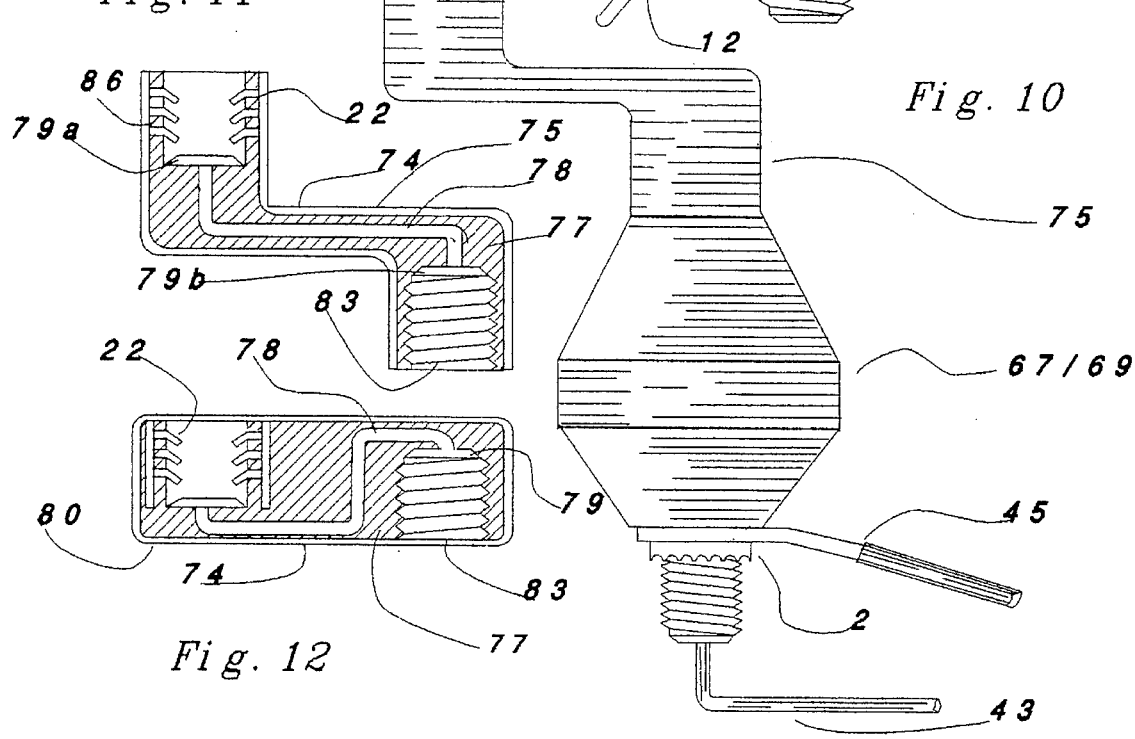
Fig. 11
Fig. 12

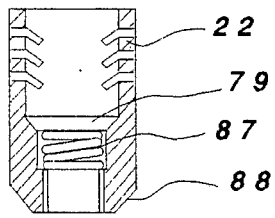
Fig. 13a
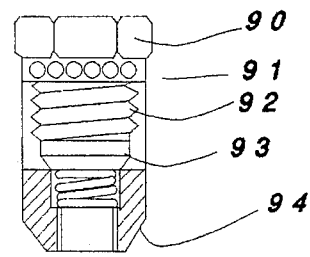
Fig. 13b
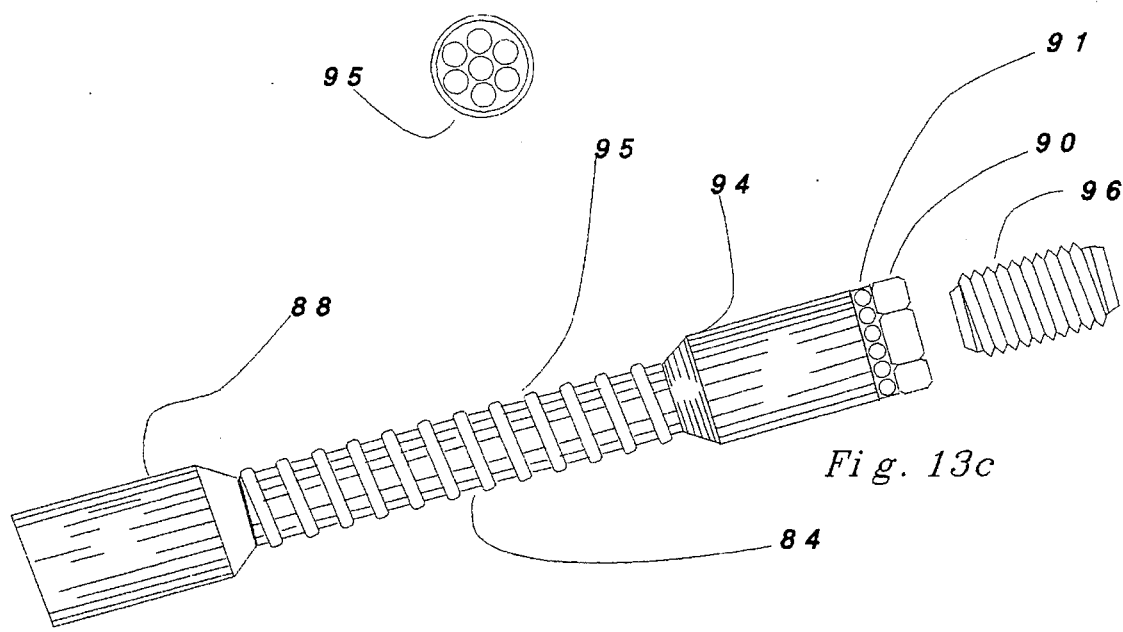
Fig. 13d
Fig. 13c

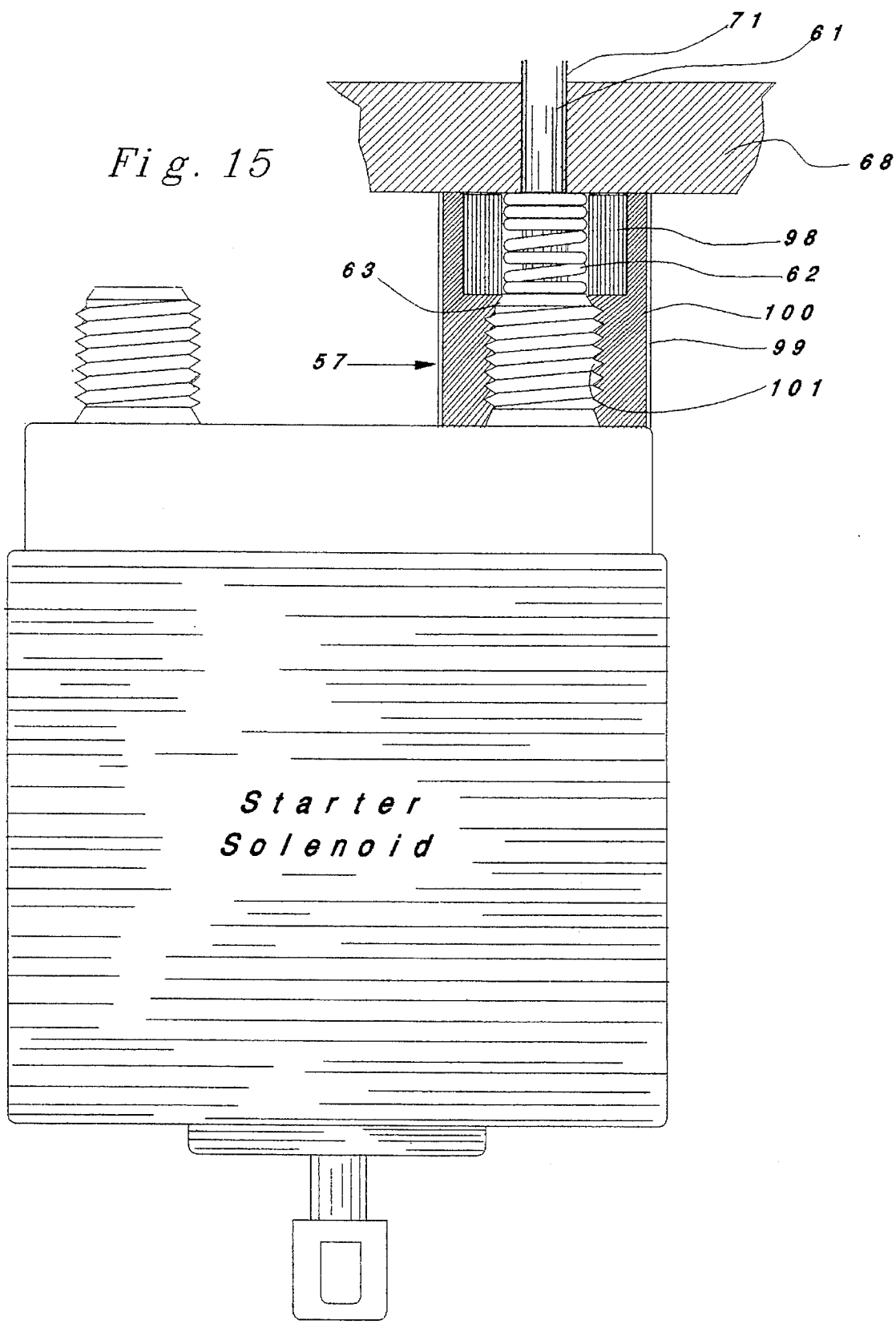

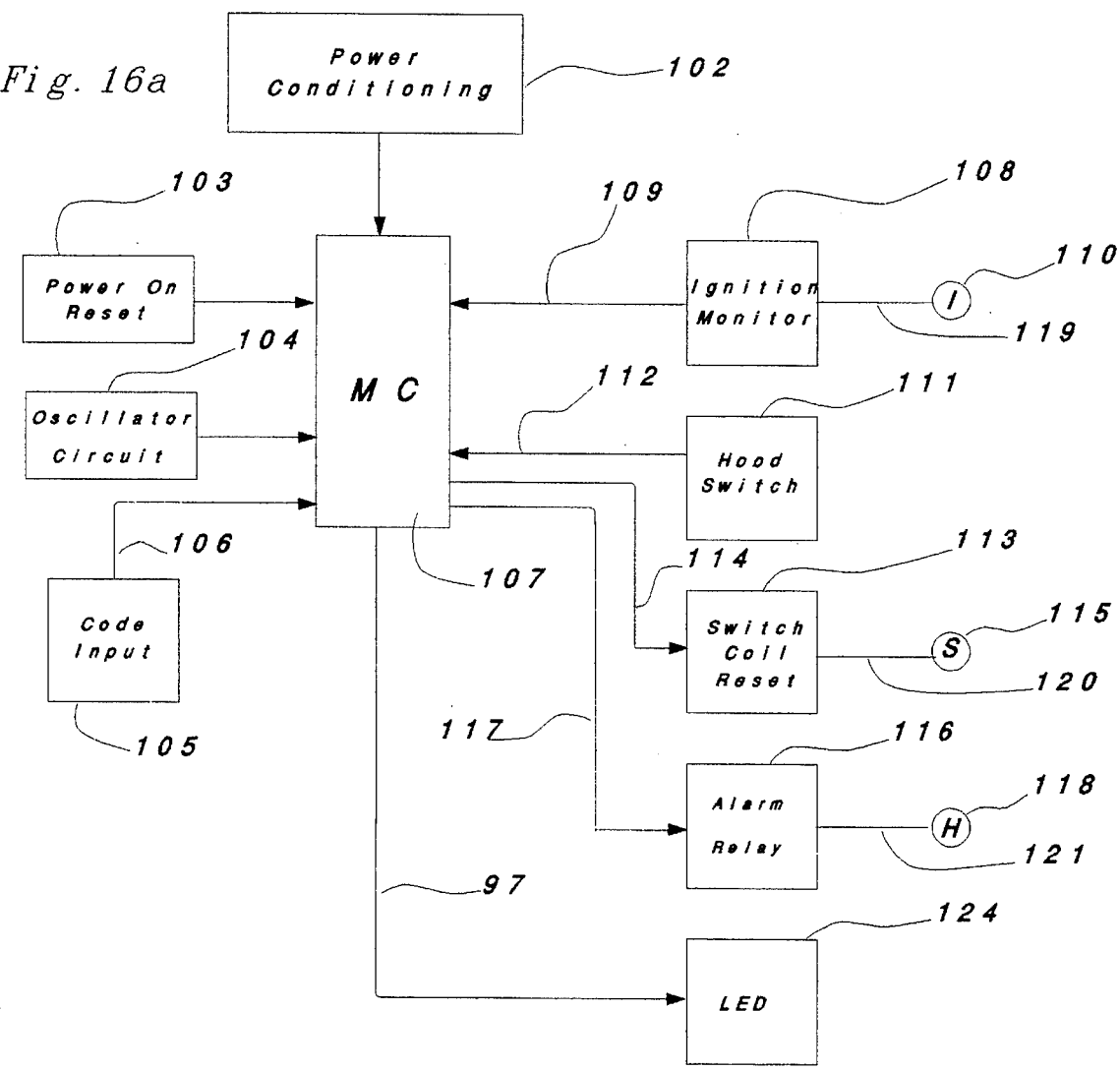

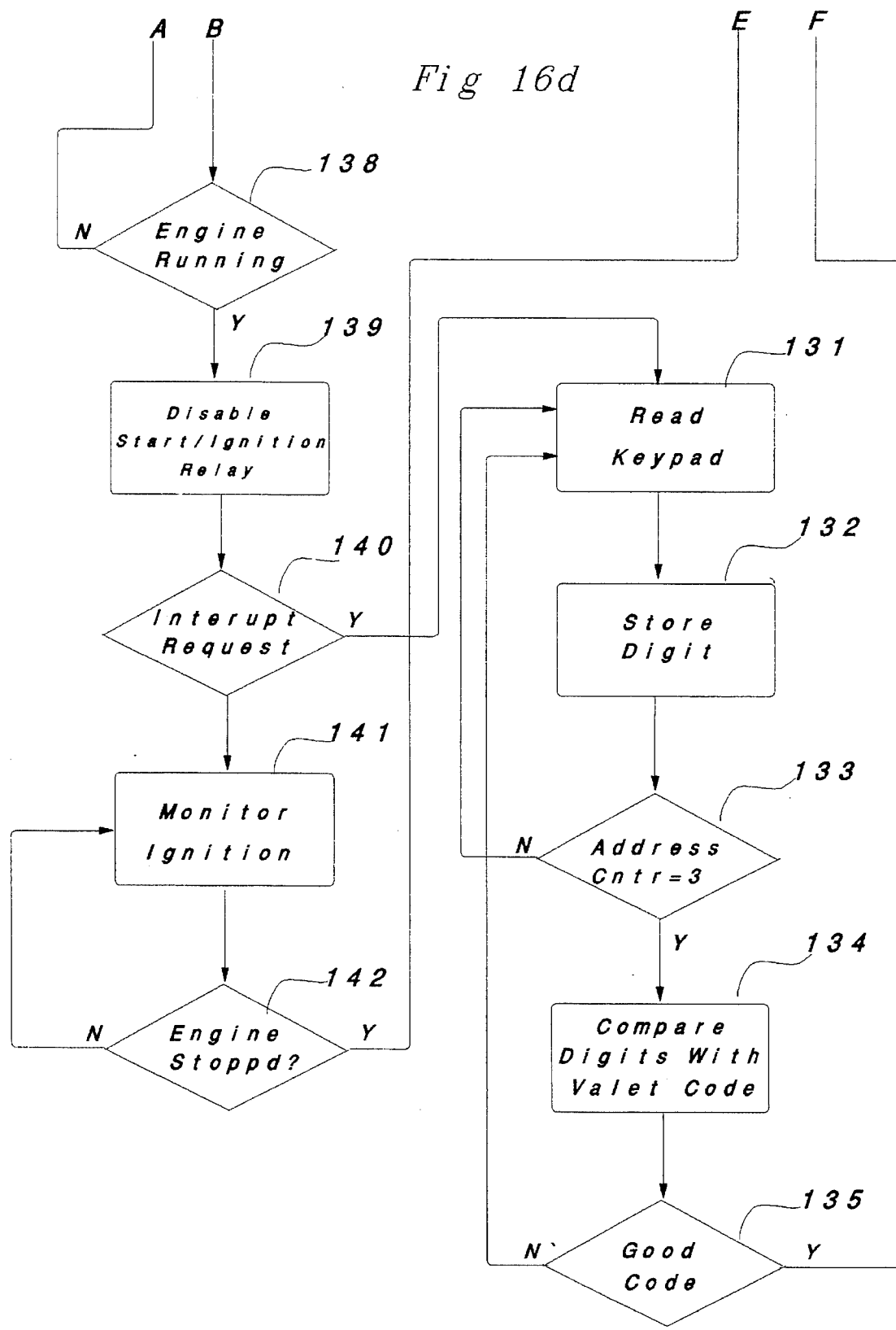

AUTOMOTIVE ADAPTABLE SECURITY MODULE FOR A STARTER SOLENOID

BACKGROUND

1. Field of Invention

This invention relates to a device for disabling the electrical starter motor of an internal combustion engine against unauthorized activation. More particularly the invention relates to an improved combination locking method for the starter motor solenoid coil circuit and associated security device to defeat attempts to enable the electrical starter motor.

2. Description of Prior Art

In the past key actuated or combination type lock systems have been used to prevent unauthorized activation of various electrical circuits, such as the ignition circuit and the like in motor vehicle engines to prevent theft. These have included electrically coded keys, mechanically coded keys, magnetically coded keys, electro-optically coded keys, bar coded keys, digital entry keypads and various combinations thereof.

Disadvantages attending the prior art devices are their failure to prevent known methods of defeating the system by bypassing the system by "hot wiring" or "jumping".

The security system of the present invention is suited for use with any of the known code entry structures. Features which distinguish the present invention over the known prior art include: an input structure suitable for use in connection with any of the known key structures; a microprocessor or microcontroller decision making element; a computer program storage means which is configurable by electrical or electronic means; a controllable electrical circuit interruption element; a unique circuit housing element and mounting means; and a means to monitor vehicle hood and door positions,

OBJECTS AND ADVANTAGES

It is an object of the invention to provide a means of disabling an internal combustion engine starter motor.

Another object of the invention is to provide a security system impervious to known methods of tampering.

Yet another object of the invention is to enable an alarm system if vehicle hood or doors are opened and disables vehicle ignition coil primary circuit.

Still another object of the invention is to provide a code entry means utilizing known coding devices.

The security system of the present invention provides security against tampering of a combination operated system. The combination provides a code for the electronic security system. A decision making element determines whether the input code matches a preset code stored in memory. If the codes match the decision making element operates the circuit interruption element and enables the starter motor solenoid circuit.

The decision making element monitors the hood and door positions. If hood or doors are opened the decision making element enables the alarm system and disables the starter solenoid and ignition coil primary circuit.

A unique circuit housing element is mounted directly to the starter motor, attaching to the starter motor high current input stud bolts. The manner of mounting is permanent; once installed it cannot be removed. In order for a successful vehicle theft to occur, the thief must remove the present starter motor assembley and replace it with a new, standard starter motor and re-make the electrical connections.

Due to ever increasing development of formidable vehicle anti-theft devices, vehicle theft practices have gone, in some cases from circumventing anti-theft devices that offer some prevention of theft, to physical removal of the owner from the interior of the vehicles cab at gunpoint or physical endangerment to the vehicles owner. These new brazen occurances of theft practices, place the vehicles driver in a dangerous vulnerable state, subjectable to giving up the vehicle, or pay the consequences. It is an intention of this present invention to address this dangerous potential, and enable the endangered driver a passive non-threatening way from the vehicle, and yet, have the ability to recover the vehicle, after law enforcement has located the abandoned vehicle.

DRAWING FIGURES

FIG. 1 side view of the present invention, showing the relative location of the present invention to the starter solenoid.

FIG. 2 side view of the present invention, showing the relative location of the present invention to the starter solenoid.

FIG. 3 exploded view of the major mechanical assemblies in their relative mounting positions.

FIG. 4 cut away view of the preferred embodiment module 1, mounted in position a top the and connected to the starter solenoid.

FIG. 5 exploded views of module connection shaft assemblies

FIG. 6 cut away view of module protection housing sleeve and weather boot.

FIGS. 7A and 7B cut away view of module design #2. Module construction and component assemblies.

FIG. 8 cut away view of module design #3. Module construction and components assemblies.

FIG. 9 view of preferred embodiment 2. Module attached to FIG. 10 goosed neck module adaptor.

FIG. 10 positional goose neck module (2 or 3) adaptor power cable assembly.

FIG. 11 module 2 or 3 adjustable adaptor power cable assembly.

FIG. 12 module 2 or 3 steel spiral flexible variable position adaptor power cable.

FIGS. 13A and 13B are partial cross sectional views of the starter solenoid adapter connector and module terminal connector.

FIG. 13C detailed depiction of starter solenoid module connectors illustrated in FIG. 8, 9, 10, 11 and 12.

FIG. 13D is a partial cross-sectional view of the flexible power adapter.

FIG. 14 detailed depiction of FIG. 7 module connector assembly.

FIG. 15 shows assembly 57 detail of FIG. 8.

FIGS. 16A to 16D shows the electronic block diagram and software flow charts.

REFERENCE NUMERALS IN DRAWINGS

Figure 3:
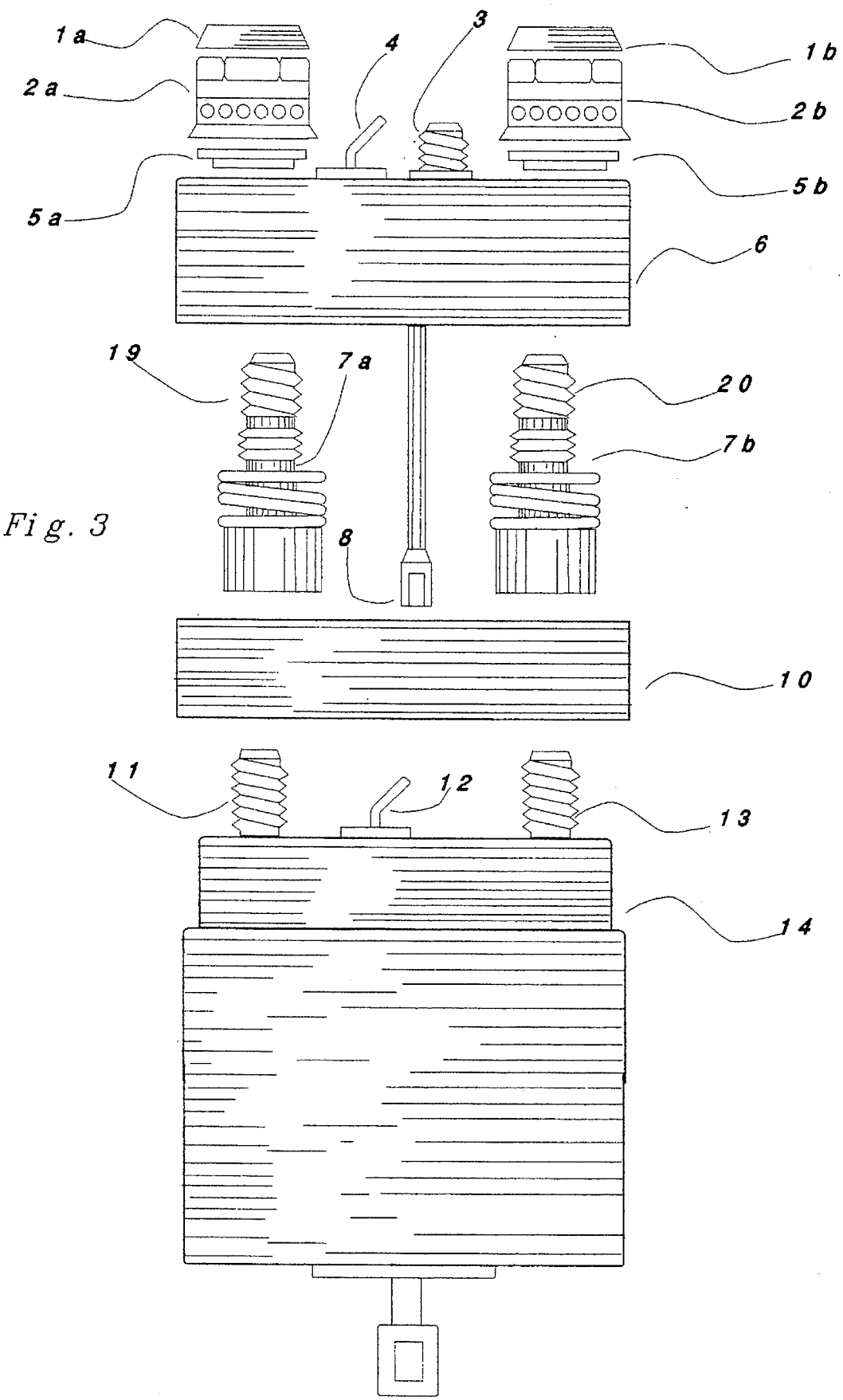

1. Threaded bolt lock cap.

2. Perforated shear type hex fastener.

3. Code input connector.

4. Module solenoid control circuit input terminal.
5. Battery terminal insulation washer.
6. ASM module, (first preferred embodiment)
7. Module lock shaft assembly.
8. Module upper structure plate.
9. Module solenoid control circuit output lead assembly.
10. Solenoid weather sleeve.
11. Starter solenoid power terminal
12. Module lock shaft conductive element and mounting screw.
13. Starter solenoid auxiliary terminal.
14. Starter solenoid.
15. Lower shaft adjuster plate.
16. Module roller bearing housing.
17. Lower module mounting plate.
18. Electronic PWB and associated components.
19. Module battery power terminal.
20. Auxiliary shaft terminal.
21. Module lock shaft.
22. Retainer ring lock tabs.
23. Retainer Ting containment mount bracket.
24. Washer.
25. Hex nut fastener.
26. Mounting bolt.
27. Shaft compression spring.
28. Module lock shaft hex tightener.
29. Module lock shaft parallel retainer ring lock grooves.
30. Module top plate lock shaft passage.
31. Lower shaft contact point with starter solenoid terminal keeper.
32. Lower lock shaft starter solenoid terminal keeper.
33. Lock shaft conductive element.
34. Lower lock shaft, rotatable shaft adjustable free space.
35. Shroud lock stud caps.
36. Module protective shroud.
37. Module shroud lock cap connector bolt. (4)
38. Multiple compression springs. (4)
39. Lower shaft cinch.
40. Shroud weather boot impact dampener.
41. Multiple impact absorbing rubber pads.
42. Shroud mounting holes.
43. Code input cable.
44. Input cable perforated shear off hex fastener.
45. Battery cable.
46. Input cable receptor.
47. Battery cable conductive keeper.
48. Non conductive insulator washer.
49. Module upper structure plate.
50. Contact solenoid high current input terminal connection.
51. High current solenoid contact switch.
52. Starter solenoid auxiliary cable.
53. Mid section roller bearing housing.
54. Module housing rotational free space. (FIG. 9)
55. Mount pins.
56. Retainer ring lock assembly. (FIG. 14)
57. Module retainer ring lock connector assembly. (FIG. 15)
58. Connector body.
59. Starter solenoid weather boot.
60. System PWB.
61. Contact solenoid switch output terminal.
62. Terminal compression spring.
63. Terminal conductive element.
64. Not used.
65. Upper structure rotatable bearing. (FIG. 9)
66. Lower structure rotatable bearing. (FIG. 9)
67. Complete module assembly (second preferred embodiment)
68. Solid steel module housing. (FIG. 9)
69. Complete module assembly (third preferred embodiment)
70. Impact deflection plate.
71. Output conductor passage, FIG. 15
72. Solid steel lower housing FIG. 8
73. Not used.
74. Non-conductive insulation coating and protector.
75. Module extension power adaptor.
76. Not used.
77. Adaptor structure.
78. Conductive cable element.
79. Conductive element.
80. Module lateral extension adaptor.
81. Not used.
82. Not used.
83. Starter solenoid terminal threaded keeper.
84. Flexible power adaptor. (FIG. 13D)
85. Connector retainer ring lock.
86. Not used.
87. Conductive element compression spring.
88. Starter solenoid adaptor connector.
89. Not used.
90. Adaptor shear off hex.
91. Adaptor shear off perforated band.
92. Not used.
93. Conductive element.
94. Module terminal connector
95. Stainless steel spiral cable and cable protector.
96. Module to spiral adaptor connective male adaptor.
97. LED enable conductor.
98. Rubber (non-conductive) insulator O ring.
99. Module (non-conductive) insulator.
100. Starter solenoid terminal steel core housing.
101. Starter solenoid female keeper threads.
102. Voltage conditioning circuit.
103. Power-on reset circuit.
104. Oscillator circuit.
105. Code input means.
106. Code input conductor cable.
107. Microcontroller.
108. Ignition monitor circuit.
109. Ignition monitor output conductor.
110. Vehicle ignition circuit.
111. Hood snitch.
112. Hood switch output conductor.

113. Solenoid coil relay.
114. Solenoid coil relay control conductor.
115. Vehicle starter solenoid.
116. Alarm relay.
117. Alarm/ignition relay control conductor.
118. Existing vehicle horn.
119. Ignition monitor input conductor.
120. Solenoid control relay output conductor.
121. Alarm relay output conductor.
122. Microcontroller power-on reset firmware.
123. Microcontroller initialization firmware.
124. Flash LED subroutine.
125. Interrupt service subroutine.
126. Hood switch monitor subroutine.
127. Hood switch condition test subroutine.
128. Alarm output service subroutine.
129. Alarm timer subroutine.
130. Timer status test subroutine.
131. Input code subroutine.
132. Code data subroutine.
133. RAM address counter subroutine.
134. Compare RAM and ROM data subroutine.
135. Correct code subroutine.
136. System timer subroutine.
137. Enable solenoid subroutine.
138. Engine running test subroutine.
139. Disable solenoid and ignition relay subroutine.
140. Valet interrupt service subroutine.
141. Ignition monitor subroutine.
142. Engine stopped test subroutine.
143. Door switch.
144. Door switch output conductor.
145. Ignition relay.
146. Ignition coil current conductor.

DESCRIPTION OF PREFERRED EMBODIMENTS

In the following description, preferred embodiments of the present invention will be described as a vehicle auto theft to secure and isolate vital vehicle engine starter system functions, within the confines of a secure, impenetrable containment housing permanently attached to the starter solenoid, and specifically designed to prevent forced removal of the module by an auto thief.

Due to ever increasing development of formidable vehicle anti-theft devices, vehicle theft practices have gone, in some cases from circumventing anti-theft devices that offer some prevention of theft, to physical removal of the owner from the interior of the vehicles cab at gunpoint or physical endangerment to the vehicles owner. These new brazen occurrences of theft practices, place the vehicles driver in a dangerous vulnerable state, subjective to giving up the vehicle, or pay the consequences. It is an intention of this present invention to address this dangerous potential, and enable the endangered driver a passive non-threatening way from the vehicle, and yet, have the ability to recover the vehicle, after law enforcement has located the abandoned vehicle.

Figure 16B:
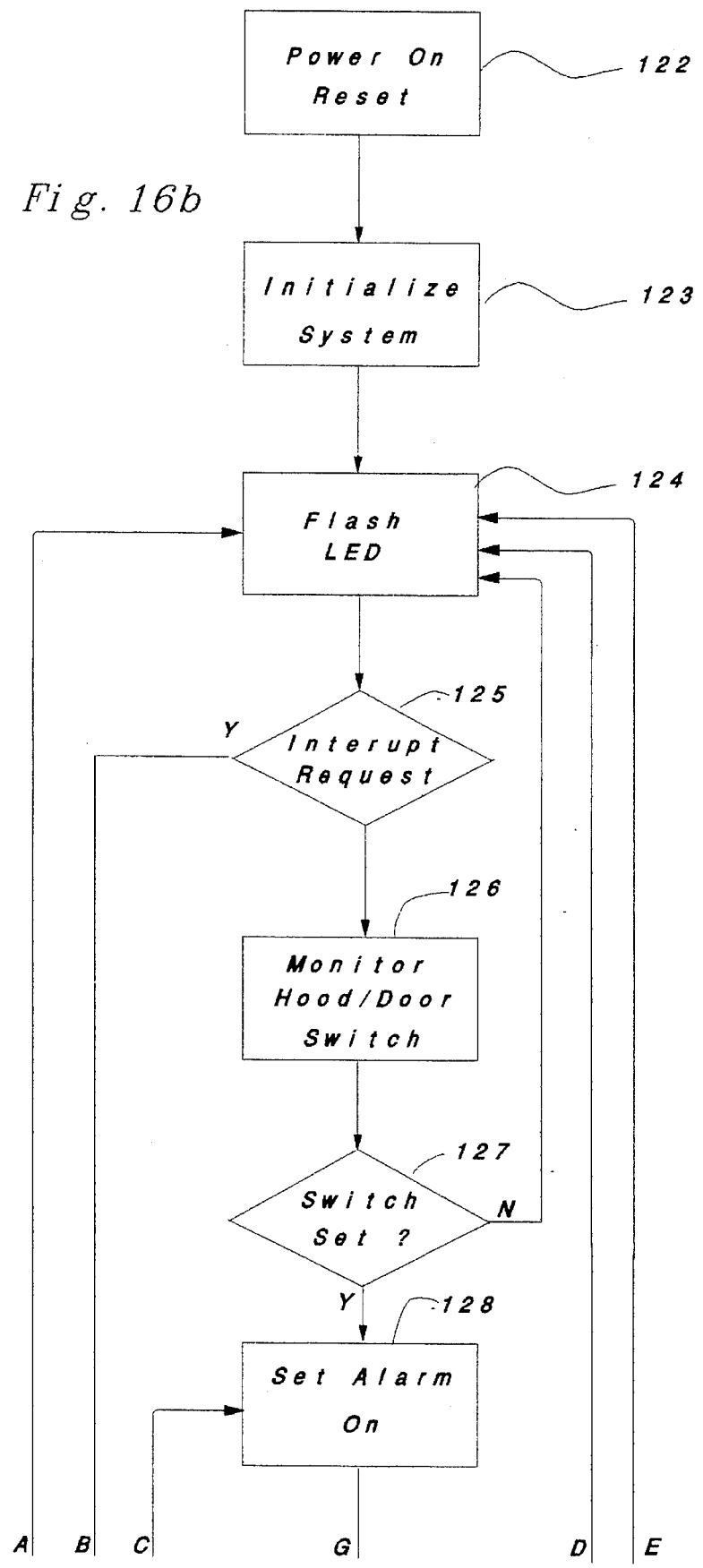
Figure 16C:
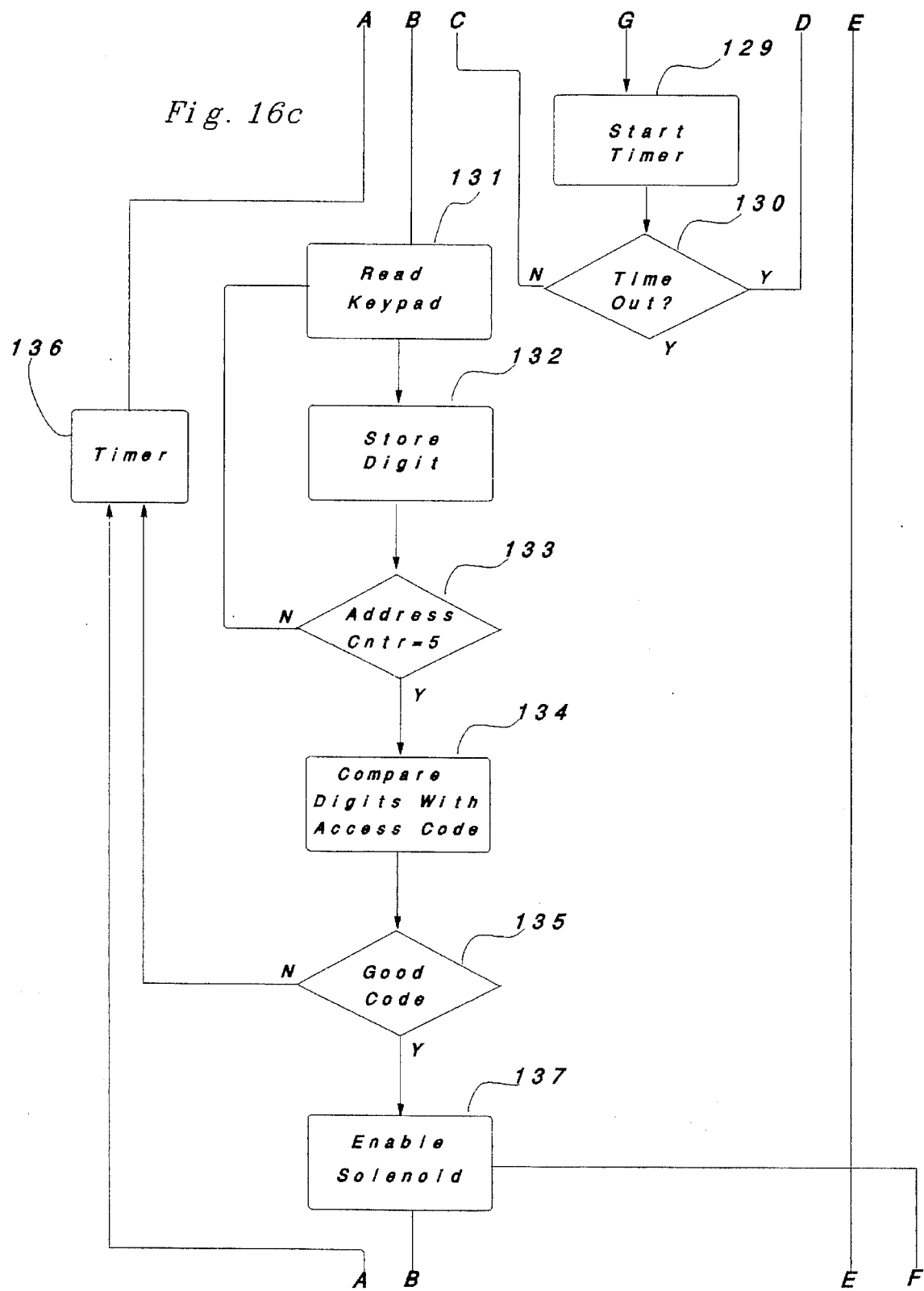

As shown in FIG. 1, a tubular steel anti-theft security module, that houses and protects vital starter disabling circuits from tampering from the exterior of the present invention. It is the intention of the following text to describe and illustrate in detail the security attributes built into the systems design. FIG. 1 represents a side view depicting hardware arrangement of the first preferred embodiment. It is the intention of the present invention to connect module 6 to starter solenoid 14, by means of bolting module connector fasteners FIG. 3, 7a. and 7b. to 11 and 13 starter solenoid terminals. 4; module solenoid control circuit input terminal connector, to join starter solenoid coil lead 12, at installation. Enable/disable solenoid coil lead circuit switching functions are carried out within the confines of 6. Detailed illustrations concerning the premise and general scope of this invention explained in the software system description, electronic interrelation circuit description block diagram FIG. 16a., and software flow chart drawings FIG. 16b, FIG. 16c and 16d. 3, the system code input connector, integrates cable wires directly to the circuit board and system microcontroller, housed within 6. System module preferred embodiment 1, assembly 6. 14, a typical automotive starter solenoid. Starter solenoid weather sleeve 10, protects the front end of the starter solenoid from damage. 10, in the shape of a metal ring, serves as a fill-in ring to the indented frontal end of the starter solenoid, on some starter solenoid designs, and makes a tighter installation fit between the bottom plate of the module FIG. 4, 17, and the extreme terminal end of the starter solenoid. The outside diameter of the starter solenoid and the module's outside diameter, share the same diameter and general configuration of the two units together at installation. Both mount as a flush integral unit. System fastening and electrical connections between the module and starter solenoid are examined in detail in FIGS. 4 and 5. Module lock shaft assembly conductive threaded terminals 19 and 20. FIG. 6, assembly 7, attaches to starter solenoid 19 attaches to starter solenoid battery terminal 11, and terminal 20 attaches to starter solenoid auxiliary terminal 13 in a similar manner. Most automotive starter solenoids share the canister shaped housing and location of the 3 electrical contacts, of which all are located in the frontal end of the starter solenoid. The commonality that most starter solenoid designs share, provides easy adaptability of 63, described in FIG. 1, to most vehicle starter solenoid systems. In some examples of existing starter solenoid configurations, some of these other types of starter solenoids, do not have the auxiliary solenoid terminal FIG. 1 13 grouped together with the solenoid coil lead at the front end of the starter solenoid case. Because these starter solenoid terminal arrangements cannot be adapted with the terminal keepers of lock shaft assemblies 7a. and 7b. of preferred embodiment 1, it has been necessary to design a second preferred embodiment security module. It has been discovered that in order to accomplish this task successfully, the starter solenoid battery terminal 11 must be isolated and protected from breach access by a would-be thief, by providing a non removable module housing 87 to mount at 11. Once the module has been installed on the starter solenoid terminal 11, it will not be able to be removed by any known tool available. Electrical starter system disabling functions, cannot be accessed from the exterior of the protective module. Second preferred embodiment may be adaptively installed on existing starter systems, giving the vehicles owner protection from vehicle theft. Second preferred embodiment electrical functions: Battery power to the starter solenoid 11, is interrupted by control circuits activating or de-activating the battery current flow to the starter solenoid. The switching element of this module design, is that of a high current contact solenoid, that completes the high current circuit from the battery power source to the starter solenoid power terminal 11. System control encompass system ROM microprocessor, software program instructions dictating high current switching circuits, all of which are based on correct access code input from the operator within the vehicles interior FIG. 16a. 105. All switching functions, and control components are located within the confines of the protective module housing 67.

FIG. 2. A side view depicting second preferred embodiment 67. 67 mounts to 11, the positive battery terminal of tile starter solenoid 14. Starter solenoid coil lead connector 12, remain exposed and are not involved in the disabling functions of this embodiment to that of the starter system, as is described in first preferred embodiment; FIG. 1.

FIG. 3 Exploded view of the major component assembly of 6 first preferred embodiment. In the order of installation, the starter solenoid 14, accepts the starter solenoid weather sleeve 10 to recessed indentation of the starter solenoid terminal location, just ahead of the canisters main body. Sleeve 10, fills in the gap between the outer diameter (the indented) frontal end of the starter solenoid, and the diameter outer diameter of 6. The weather sleeve 10, makes the two mounted assemblies flush, and because of this arrangement of flush exterior walls, the act of a thief attempting to attach a gear puller tool in between the base of the module FIG. 4, 17 and the recessed area of the starter solenoid 14, the removal of 6 becomes nearly impossible, as the clasps of the gear puller would have no means of attachment to get a hold of, or behind 17, to force the module off of the starter solenoid. 7a. and 7b. The module lock shaft assemblies 7a and 7b., serve to attach module assembly 6 to 11 and 13, by means of attachment of assemblies 7a. and 7b; at terminal shaft thread ends 19 and 20. Further to lock the modules lock shaft battery terminal 19, and auxiliary terminal 20 to their respective connection locations. Non-conductive insulation washers 5a. and 5b; mounted over terminals 19 and 20, to prevent electrical connection to the body of 6. Battery power cable FIG. 5; 45 attaches at 19, and auxiliary cable 76 (not shown on drawing) to terminal 20. Perforated shear type hex fasteners 2a. and 2b; are threaded and torqued to terminals 19 and 20. 2a; and 2b; perforated shear type hex fasteners are torqued to 19 and 20 until a prescribed torque value is met, wherein the upper portion 2a. and 2b; shears off at the weak perforation center area illustrated FIG. 4, permanently fastening 2a. and 2b. to their threaded keepers. Lock caps 1a. and 1b; fasten to protruding threaded shaft tips exiting from 2a; and 2b; 19 and 20, for final installation locking positions. Locking 6 to terminals 11 and 13. 4, 9 and 12 are three portions of the solenoid coil control circuit. Module solenoid control circuit input terminal 4, receives voltage from the starter system switch. Module solenoid control circuit output lead assembly 9, as is depicted departing module 6, and is connected to starter solenoid coil input terminal, 12. 6, first embodiment as is viewed in the assembly position.

Figure 4:
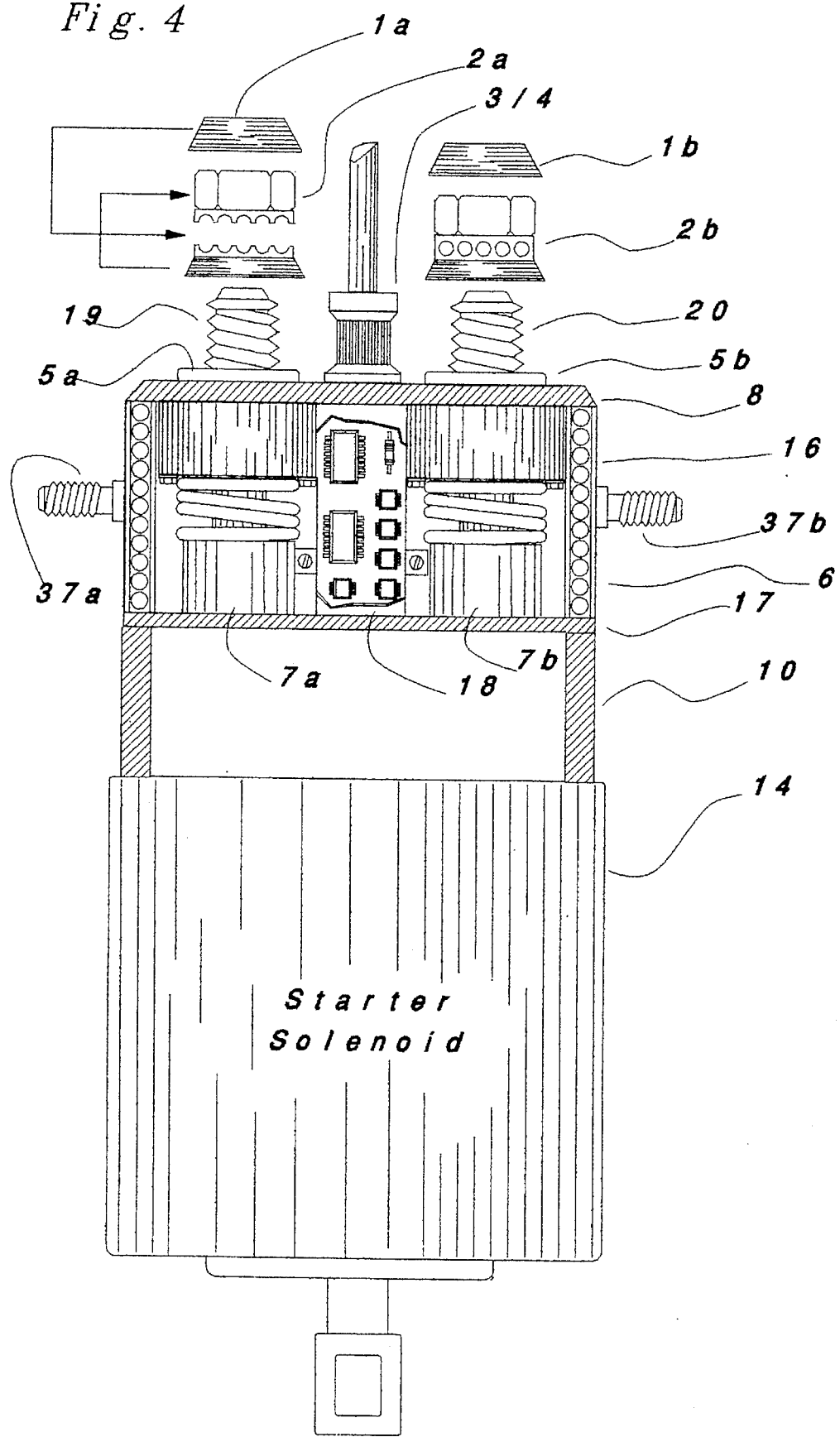

FIG. 4 A side cut away view of 6, mounted in place to that of the starter solenoid 14, and the solenoid weather sleeve 10. Exterior module surfaces 6 and weather sleeve 10, lower module mounting plate 17 and module bearing housing 16, demonstrate the alignment and flush walls of external members of the anti-pry mounted assemblies, within module confines 6 and structural plates 8 and 17. Module lower structural plate 17, has 2 holes large enough to accommodate 7a. and 7b. Module lower structural plate 17, has a third hole to accommodate passage of FIG. 3, 9 solenoid control circuit output lead assembly. 9, not shown on FIG. 4, is connected to starter solenoid input terminal 12.16, a simple internal/external rotatable bearing housing structure. Duel functional purpose of 16, to house and seal module components from harsh environment of the exterior. To provide the module protection from forced removal of the module by an auto thief employing a gripping tool and or the use of a torquing tool, to rotate 6 from that of the starter solenoid terminals 11 and 13. The act of attempted removal of 6 from 7a. and 7b. would prove fruitless as the bearing housing 16 would axially rotate around the circumference of the integral module 6, starter solenoid weather sleeve 10 and starter solenoid 14. Attempted breach or destruction of the module would prove difficult by the modules external security anti tamper design. An attempt to drill out the bearing housing 16 by an auto thief would predictably cause the drill bit to glance off of the outer bearing surface. The failed drilling, is due to the ease in which the bearing is free to rotate axially. Upper structural plate 8, a steel upper plate treated with a hardening process to prevent egress by means of a drill, or other destructive tools. Attempted breach to the modules interior component assembly by piercing the upper structural plate 8, would prove formidable. Electronic circuit assembly 18 is housed within the confines of a protective enclosure. The function of assembly 18 is the subject of FIG. 16. Connected module solenoid control circuit input terminal wire and connector 4, are located behind code input connector 3, on this FIG. 4, and are labeled at this location as 3/4. Battery cable lug connector FIG. 5, 45, and opposing auxiliary cable lug 52 (not shown) conductively mounts to two module lock shafts FIG. 5, 21 at upper threads 19 and 20, separated from conductive contact 8, by means of insulated washers 5a. and 5b. Battery cable lug FIG. 5, 45, and opposing auxiliary cable and connector lug (not shown), which would be located at 20, are permanently fastened to terminals 19 and 20 by means of perforated shear type hex fasteners 2a. and 2b. Shear type hex fasteners 2a; and 2b; shear at the perforation band when a predetermined torque value is applied to the hex nut. The sheared upper hex, is discarded after connection of 2a. and 2b. to that of terminals 19 and 20 at installation of the system to the starter solenoid. After the hex nut 2a. and 2b. have been sheared off of 2a. and 2b., there remains that of a cone shaped base of 2a. and 2b. The conical shaped fastener base is designed to prevent a thief from attaching a gripping tool to the remaining conical portion of 2a. and 2b; and removing the battery cable lug mounted to battery cable. Attachment of a torquing tool to the exposed conical shaped base would result in the tool jaws sliding off of the conical shaped base, resulting in a potential failure of removal of 2a. and 2b at 8. Installation of non-removable lock caps 1a. and 1b; provide additional security to shaft lock terminals 19 and 20, by gripping the parallel grooves at upper extremities of 19 and 20. Method of lock cap installation, by pressing said lock cap onto lock shaft grooves 19 and 20. Attachment of lock caps 1a, and 1b; are permanently attached and cannot be removed by an axial or rotational force. Protective shroud mounting studs 37a. and 37b. are the subject of FIGS. 7A and 7B, and are shown here by way of reference only. Lock shaft assemblies 7a. and 7b; illustrated in their installed positions within 6, and exiting 8.

Figure 5:
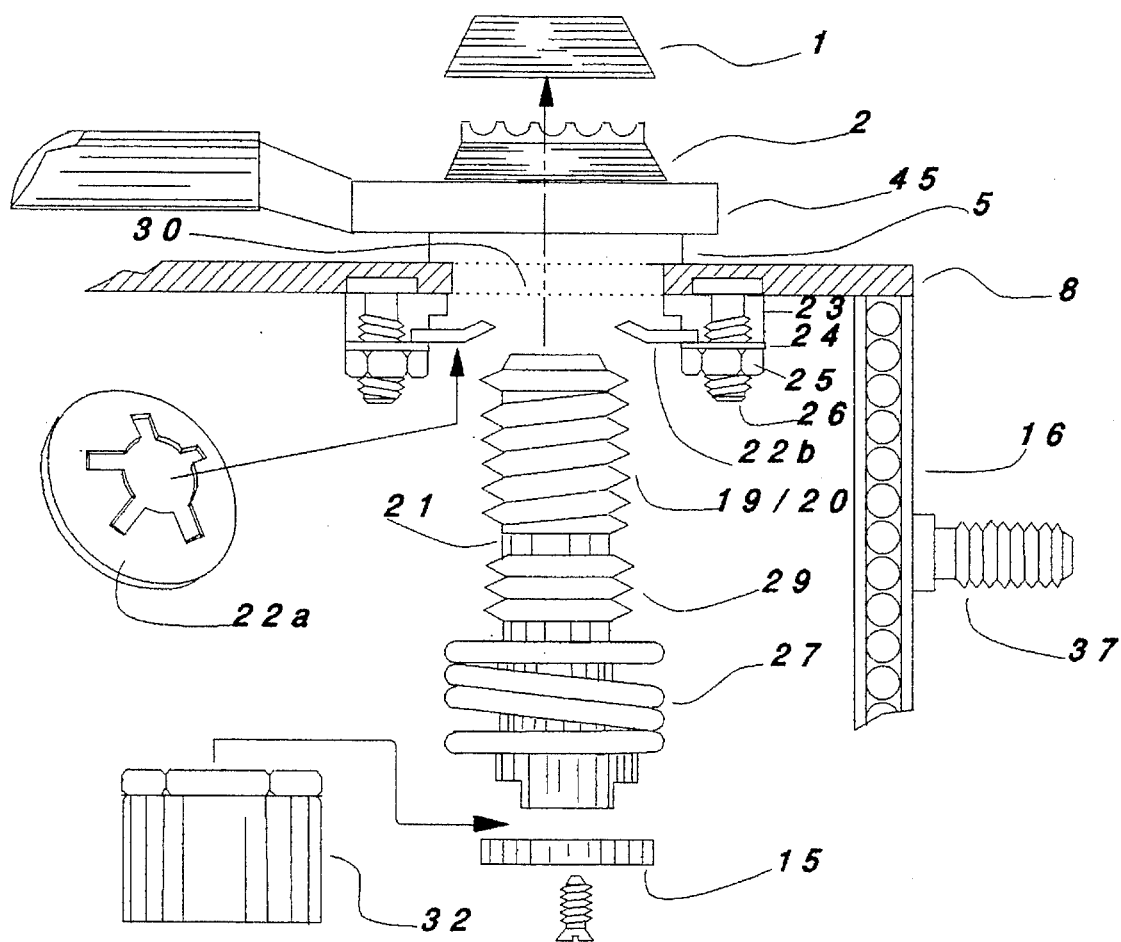
Figure 6:
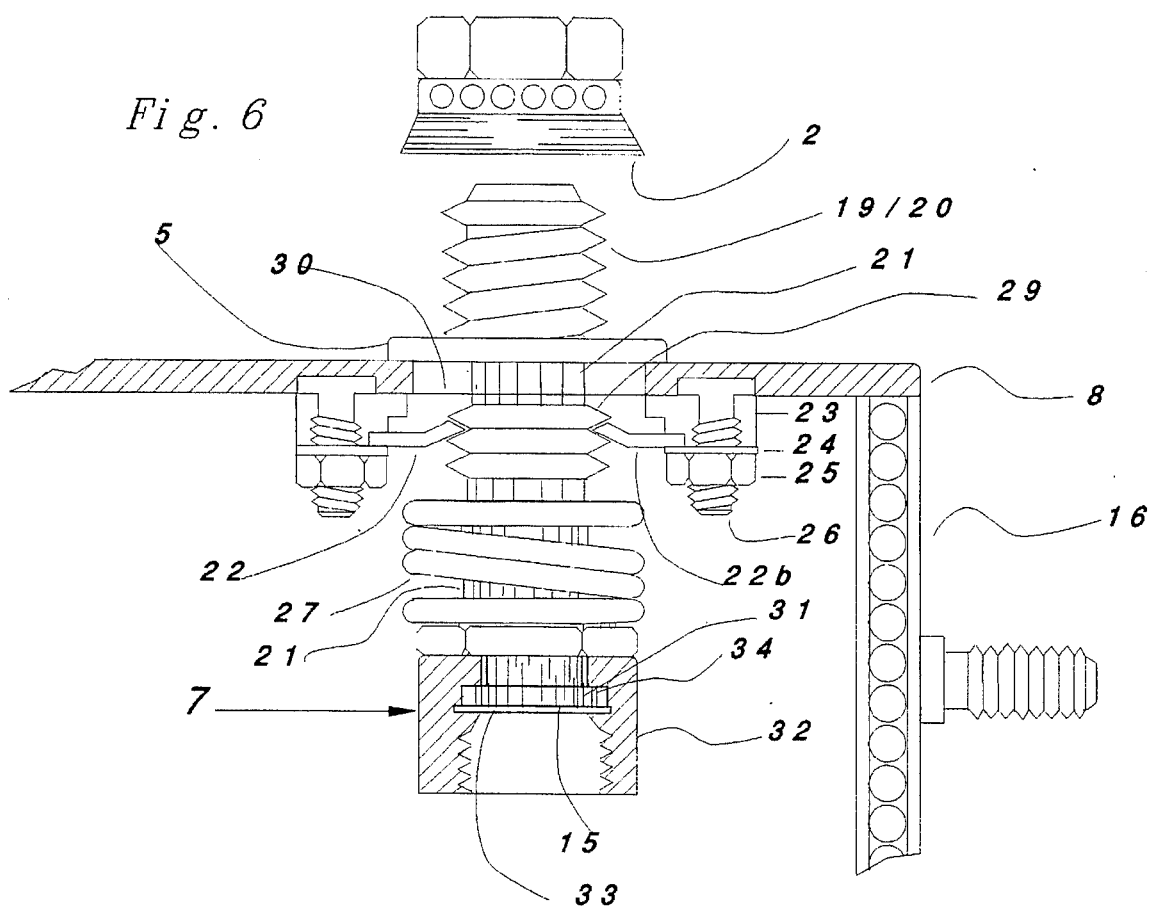

FIG. 5 An illustration depicting module lock shaft Retainer ring containment mount bracket 23 and mounting position of battery power cable and lug 45, or auxiliary cable lug 52. (not shown on FIG. 5). 15 on lock shaft 21, a rectangle adjuster plate and mounting fastener, fastens 32 to 21. FIG. 6, 32 depicts 15 fastened to 21 at 31, within the confines of 32. At this assembled position lock shaft 21 is integral with that of 32. Lock shaft 21, consisting of compression spring 27, module lock shaft parallel grooves 29, and retainer ring lock shaft assembly 23. Assembly 23 mounts to 8, and is designed to lock 21 in a permanent fashion at 29, (lock shaft grooves). Lock shaft 21, threads 19/20 enter and pass through opening 30, in 8, while module is being installed. Bracket assembly 23 mounts to under side of module upper structural plate 8, by means of mounting hardware 24, 25, and hex nut fastener 26; and attaches lock shaft 21, and in particular shaft grooves 29, to permanent position at 23. Retainer lock ring 22, composed of a round spring steel disk with multiple lock tabs, which permanently engage 29. Multiple retainer ring lock tabs of 22. 22 is composed of spring steel, and are designed to deflect in a upward direction, when lock shaft 21 engages 22 within 23. Tab deflection allows uni-directional passage of 21 to accommodate 29. Detailed installation procedures, are presented in FIG. 6, and will outline the relationship of the connecting assemblies 23 to that of FIGS. 7A and 7B, the lock shaft assembly.

FIG. 6. Described as is, a lock shaft assembly 7, connecting to retainer ring lock assembly 23. 23 connects and locks 6 to upper structure plate 8, internally to the grooves 29 of shaft 21, during installation of assembly 6 to shaft assembly 7. Lower lock shaft connector 32 bolts to starter solenoid terminal 11 or 13, by means of threads internal to 32. Lower shaft adjuster plate 15, contained within the confines of 32, designed to adjust 21 in a lateral rotatable fashion, for the purpose of attaching lock shaft assembly 7 to starter solenoid terminals 11/13, just prior to mounting of 6, to starter solenoid terminals 11 and 13 in a non removable and permanent attachment. The need to have an adjustable lower shaft mechanism, is but to provide an easier adjustable fit for the modules upper structure plate 8, hole 30 to align itself to that of shaft 21 passing through upper plate passage 30. The installer merely adjusts the lower lock shaft 21, at 15 within the adjustment free space 34, until upper shaft 19/20 is aligned in plurality at 30, which will enable lock shaft 21 to pass through 8 at 30, by means of plurality of assemblies FIG. 3 7*a*. and 7*b*, for permanent attachment of 6 to 11 and 13. Lock shaft terminal keepers 32, fasten assembly, by means of 28 to 11/13. Compression spring 27, places resistance to that of hex 28 and in an opposing lower surface area 22, in order that when the module is being pressed onto assembly 7 at installation, the resistance of 27 at 28 and 22 assist in retainer ring 22 clicking into position on shaft 21, grooves 29, as the module seats at weather sleeve 10, FIG. 4.

Figure 7A:
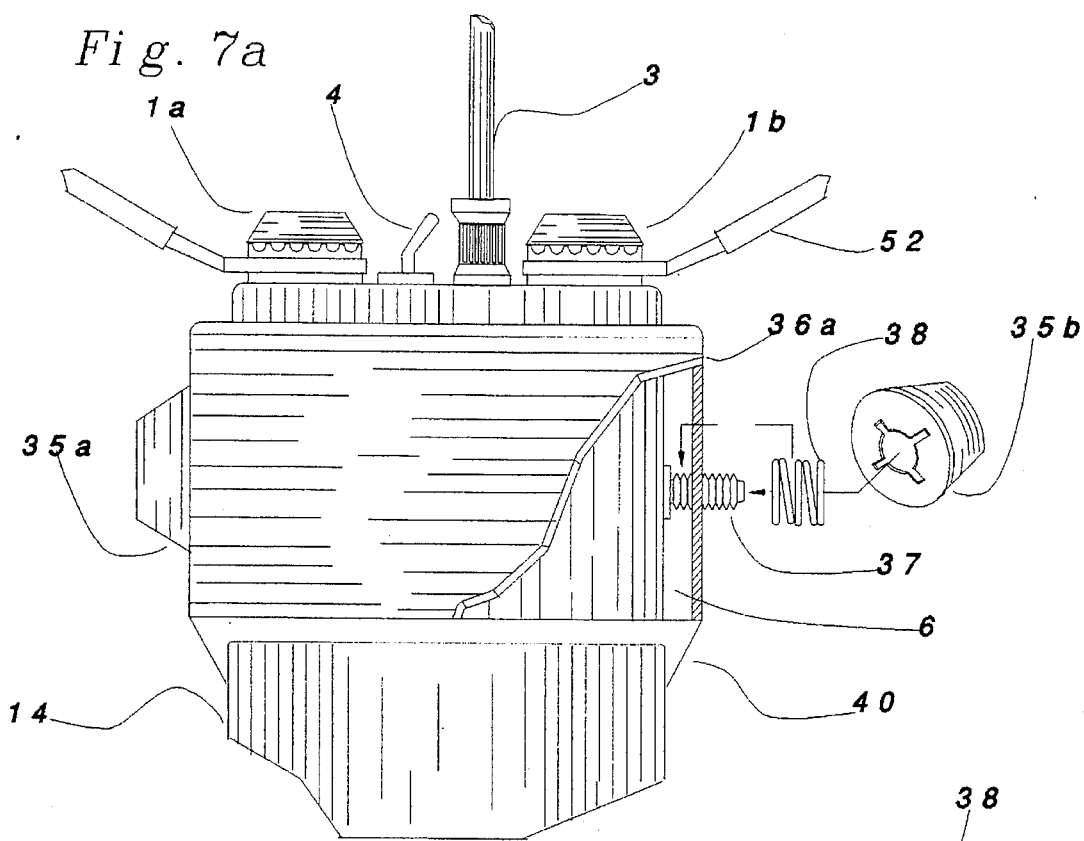
Figure 7B:
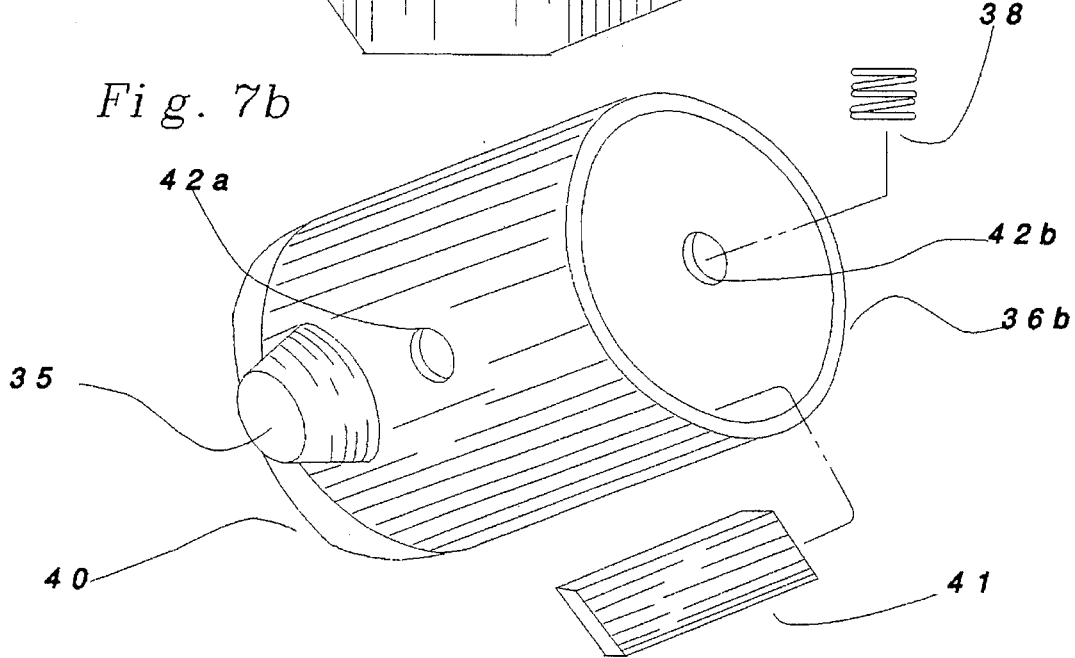

FIGS. 7A and 7B. Expected attempts to remove 6 from the starter solenoid 14, by an auto thief striking the module with a hammer like tool, in attempts to destroy 6, is being addressed by a module protective shroud 36. 36 is placed over 6, at installation for the sole purpose of absorbing possible damage to the module by means of brute force. Protective shroud 36 is attached to 6, bearing structure 16 by means of grooved studs 37*a*. and 37*b*. 36 placed in position over mounting studs 37*a*. and 37*b*; suspended in between outer wall 6 and inner wall 36, by compression springs 38*a*. and 38*b*; and held in place permanently on 6, by lock stud caps 35*a*. and 35*b*. 35 is designed as a permanent non-removable fastener that prevents a prying type tool from forcing 35 off of 37. 41 a rubber-like material 41, placed between outer module 6 surface and inner surface of shroud 36, is for the purpose of absorbing additional destructive impact. A rubber like shroud weather boot 40, protects the base of 36 from force received at that point, as well as preventing elements of the harsh exterior of exposure and the damaging effects of the road. Lock stud caps 1*a*. and 1*b*; illustrated locked onto the top grooves of 19 and 20 over 2*a*. and 2*b*. Fasteners 2*a*, and 2*b*. depicted as installed on threads 19/20, of 21. Partial shroud cutaway view illustrating 36 connecting to 6 by means of 35 and 38. Module protective shroud 38 fabricated from a spring-like metal alloy. When destructive impact is applied to the exterior surfaces of 36, multiple springs 38*a* and 38*b* and the impact dampening characteristics of the spring steel shroud 36 flex inwardly when receiving destructive impact, then return to original position, prior to impact. Shroud weather boot 40 connects 36 to 14 to dampen force at 40 my means of a pliable rubber-like environmental seal to protect system from road hazards. 2*a*. and 2*b*. in position as reference.

Figure 8:
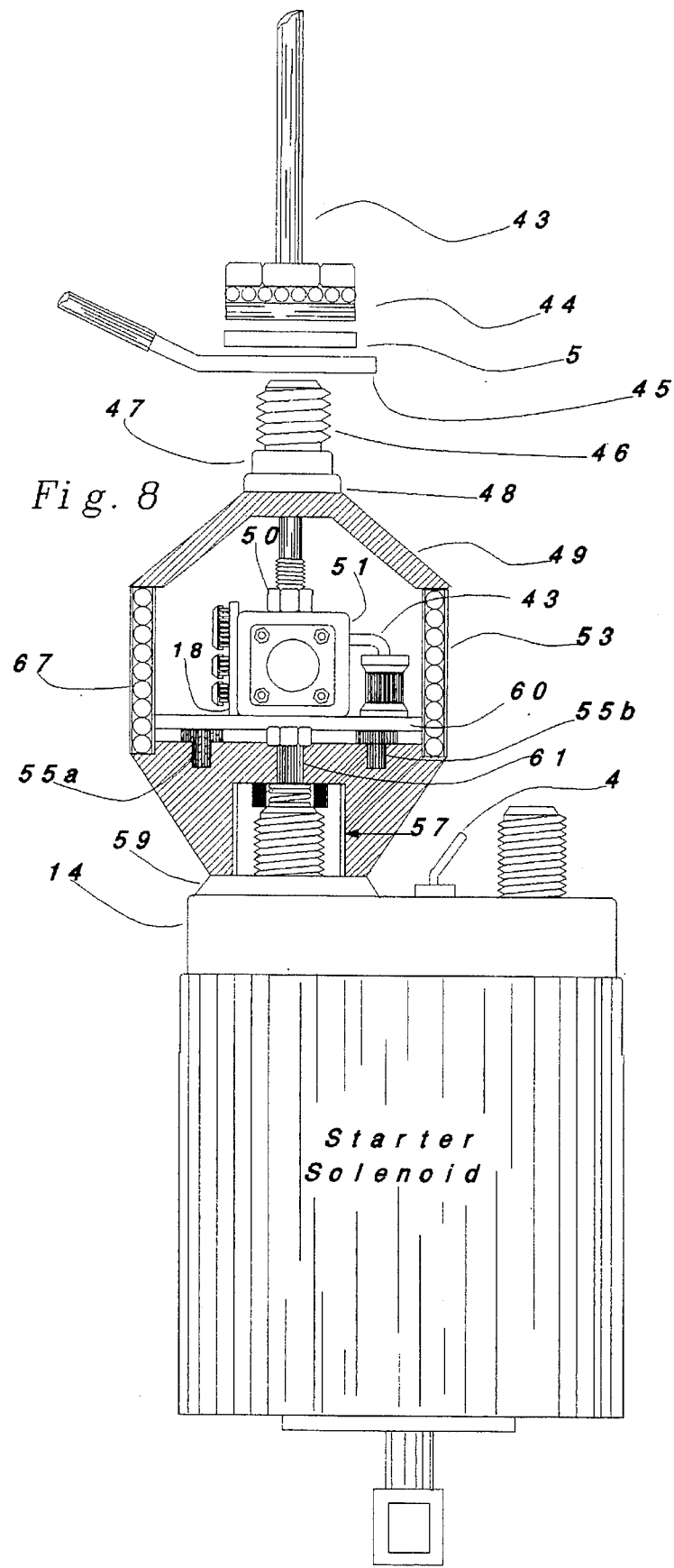

FIG. 8 Due to variable positioning of starter solenoids mounted to starter motors on a variety of engine configurations encompassing hundreds of existing motor vehicle models and makes, and because there are brackets, hoses and cables often blocking module mounting locations. Another major reason for providing another design type is due to some starter solenoids not having both the battery terminal posts and the auxiliary terminal posts grouped together in a symmetrical arrangement, as is the case demonstrated in detail with the description of the first preferred embodiment. Because of the in-consistent position arrangement of terminals 11 and 13 or lack of terminal 13 grouped together at 14, the use of first preferred embodiment module 6 is not adaptable to this different terminal arrangement. Without sacrificing the security offered by the first embodiments impenetrable features, described in detail in the first embodiment. This is accomplished with the implementation of variable positional connector extension adaptors, as depicted in FIGS. 9, 10, 11 and 12. All offer physical protection and isolation of starter solenoid battery power terminal 11 from tampering or hot wiring for the purpose of theft of the vehicle equipped with this anti theft security devise permanently attached to the starter solenoid. Preferred embodiment two, connects to starter solenoid power terminal 11 by means of an internal keeper assembly 57, which is illustrated in detail in FIG. 15. Refer to FIG. 15 for a complete understanding of the starter solenoid terminal 11 connecting to threaded keeper assembly 57. ASM module starter solenoid weather mount boot 59 connects 67 to 14. 56 solid steel lower structural housing contains connector FIG. 15, 57, and integrates solenoid output terminal 61 to conductive element FIG. 15, 63 and maintains constant force of conductive element FIG. 15, 63 to that of starter solenoid terminal 11, by means of compression spring FIG. 15, 62. Printed wiring board 66, attaches to 71 by means of bonded lock pins 55*a*; and 55*b*. 71 solid lower housing, welds to inner section roller bearing surface 53 at all points of the inner circumference of 53. Lock pins 55 attach to printed wiring board 60, fully integrating upper component assembly 18, 50, 51 to connectors 46, 47 and non conductive insulator washer 48. The sound rigidly of the internal components to that of the modules exterior housings 49 and 53, and are dependent on the integrity of the entire inner component assembly. The general makeup of the modules exterior housing is that it is composed of a three part housing structure 67, as a whole fused housing assembly, held together by inner circumference welds of module upper structure 49 to that of inner track 53 and circumference weld of lower inner wall 53 to 71, completing full integration of the modules outer housing structure, to the inner module component structure. The general configuration of the modules exterior surfaces, is designed to thwart, off attempts to remove module 67 from it's mounting position bolted in place on starter solenoid positive battery terminal 11. The lower structure housing 71 is a truncated conical shaped structure, to provide an angular steel surface so that if an attempt to attach grip 56 with a gripping removal tool, would result in the tool sliding off the angular exterior surface, nullifying clockwise and counter-clockwise rotation of the module in attempts of forced module removal from FIG. 2 11. The thick steel lower structure housing 71 would be difficult to drill through by the thickness, hardness and angular positioning mount to that of the starter solenoid 14. A drilling attempt at 71 would result in the drill bit not being able to get a hold of, or start a cut to 71's outer surface. A drill bit would merely glance off outer surface ay 71. The angular positioning of 71, to that of outer bearing surface 53, prevents a gear puller tool from hooking on any outer surface from the base of 71 to the outer junction point of 71 to that of 53. Mid section roller bearing housing 53 is designed to prevent clockwise and counter-clock wise rotation of the module 67, with the aid of a gripping tool, in attempts to remove 67 from FIG. 2, 11 the starter solenoid positive terminal. Drilling outer bearing surface 53 would result in a failed attempt, as the roller bearing would rotate in either direction when drill force is applied to outer bearing surface. The effect of the drill bit glancing off of 53 would result and offer no help to gain breach or destroy module at 67. External cabling and connection to internal module components, integrate in the following text. Code input cable 43 is connected to input perforated shear type hex fastener 44. The input cable connects in plurality with cable keeper connector 46. The keeper terminal 46 internally contains a plurality of conductors. The input cable passes through 46 into the module and exits side wall of 46 prior to 46 connecting to 50, Code input cable 43 connects to PWB 60 and integrates to 18 via conductors of 60. Starter solenoid power battery cable and connector 45 make conductive contact at 47 the battery cable connector keeper. 48 an insulator washer, isolating the current to that of the contact solenoid input terminal 50. Part 5 battery terminal insulator washer prevents conductivity of 45 to 43 and 44.

Figure 9:
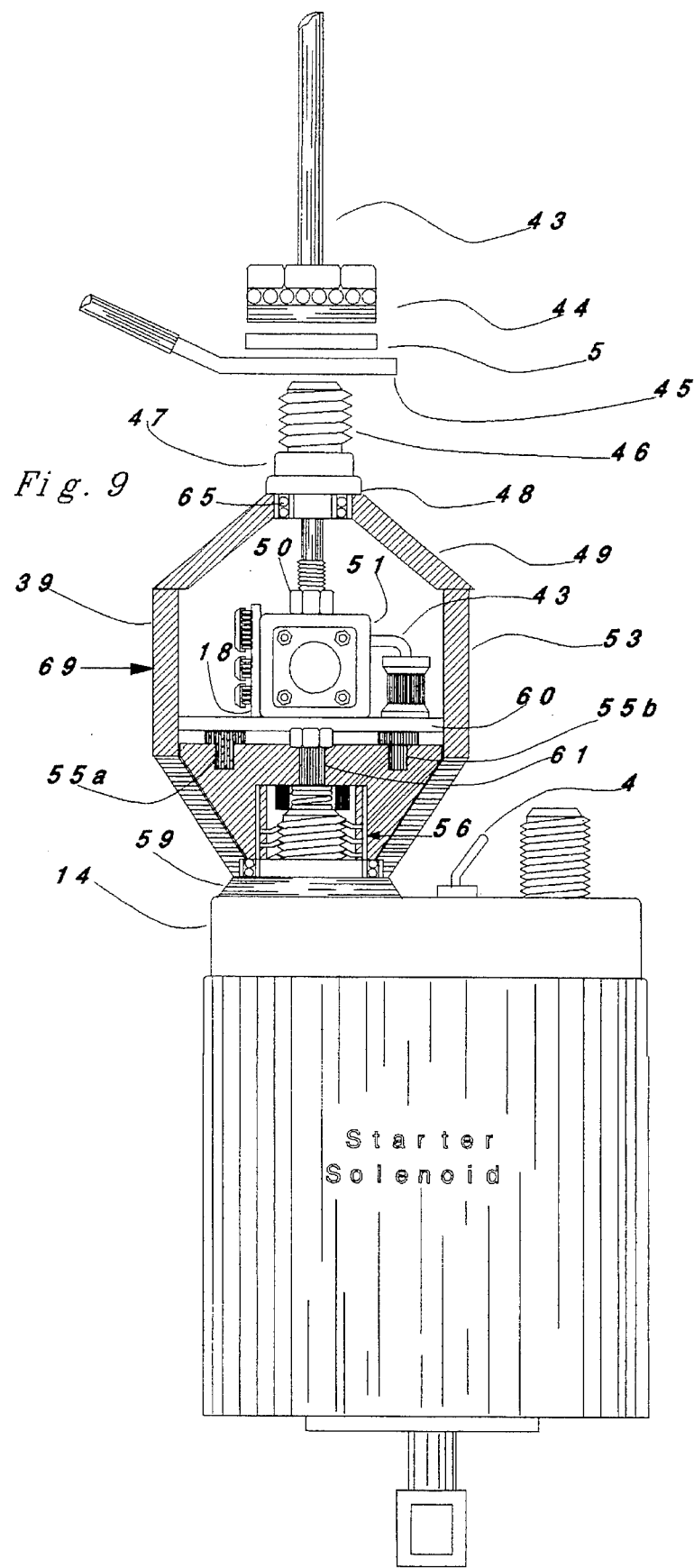

FIG. 9 This third embodiment, is electronically is identical to that of FIG. 8 second preferred embodiment. Design differences, comparing preferred embodiment two the that of preferred embodiment three lie in the rotatable functions of the housing being a single piece outer housing 49, and rotatable, in an axis at bearings 65 and 66. The entire rotatable module 69, revolves around 68 solid steel module base, by means of rotatable bearings 65 and 66. The entire strength and soundness of the modules resistance to the effects of damaging impact to the module, encompasses the modules design, as a whole integrated unit. All internal components are securely fastened to one another in an in line assembly creating integral strength, that is fortified to the module 69, by the connecting axis bearings 65 and 66. Module connection assembly 56 to that of starter solenoid terminal 11 as illustrated in detail on FIG. 14, a retainer lock ring connector assembly. 56 a non-conductive solenoid mount for 11, is bonded to inner cavity within 68, by means of an appropriate bonding agent, compatible to both bonding surfaces. 61 the contact solenoid output terminal connects to conductive element FIG. 4, 63 and is illustrated in detail in FIG. 14. Part 59 starter solenoid weather boot seals and mounts module securely to 14 the starter solenoid.

FIG. 10 On some starter system arrangements, the starter solenoid is located near engine brackets and cables, that make it difficult for the installer of preferred embodiments 2 and 3 to mount the module directly to the starter solenoid battery terminal 11. It is for this reason that there exists a need to off-set the mounting arrangements of the module to that of the available free space surrounding the starter solenoid terminal 11. It is an object of this design module extension adaptor that shares the non-removable hardware mounting connector features characteristic to that of the three module connector configurations. Installed modules employing extension adaptors FIG., 11, 12, 13A–13D are used in order to adapt these more difficult starter solenoid positions. Once the module is permanently mounted on any of the extension adaptors, human hand manipulation of a module removal techniques by an auto thief would prove difficult, as there is typically little hand add tool space for the thief to work the module off of the connector, and the connector off of the starter solenoid terminal 11. FIG. 10 Illustrates mounting arrangements of FIG. 11, 75 in a mounted position to that of starter solenoid positive terminal 11 not shown. FIG 10 demonstrates the ability of 75 to position itself in different proximities to cables or brackets that may be in the way, while mounting 67/69 to the starter solenoid 14.

FIG. 11 A battery power extension adaptor 75. Reference detailed connector assembly 56, on FIG. 14. Connector end FIG. 11, 22 is connected to 11 not shown, for a permanent mount 75 to starter solenoid terminal 11 of the starter solenoid 14. Reference FIG. 14 for an in depth look at this connector functional design. Mounting adaptor 75 to 11, is to push retainer ring lock tabs 22 onto starter solenoid terminal 11 not shown, until terminal 11 makes contact with conductive element 79 establishing a permanent conductive link to the opposing conductive element 79. On the opposing connector 79. Reference FIG. 15, for basic connector design characteristics. Locking attributes of this permanent connection assembly is described in detail on FIG. 15.

FIG. 12 80 Module extension power adaptor 22 starter solenoid connector retainer ring locks embedded in 77 adaptor structure. 78 conductive element cable, adjoining 79 conductive element. Current isolated from exterior at 74, non conductive insulation coating and protector. 83 Female starter solenoid terminal keeper threads.

FIGS. 13A–13D. Flexible power adaptor 84. Adaptor connector 88 connects to starter solenoid battery terminal 11, not shown. 94 module terminal connector adjoins to 96; connective adaptor by means of attachment at 92, female module connector threads and permanently torquing 94 to 98, while shearing hex 90 at perforated band 91. Connecting threads 96, to either FIG. 14, 56, or FIG. 15, 57. 22, retainer lock ring connection 87, conductive element 79 and compression spring 87 to force conductive element 79 to connect 11. 88, starter solenoid adapt, or connector connects to 11. 96 a connective male adaptor extends starter solenoid terminal 11 for purposes of mounting the subjects of the second and third embodiments. 93, an electrically conductive element of 94. 84 may be encased within a flexible, electrically insulating sheath 95.

Figure 14:
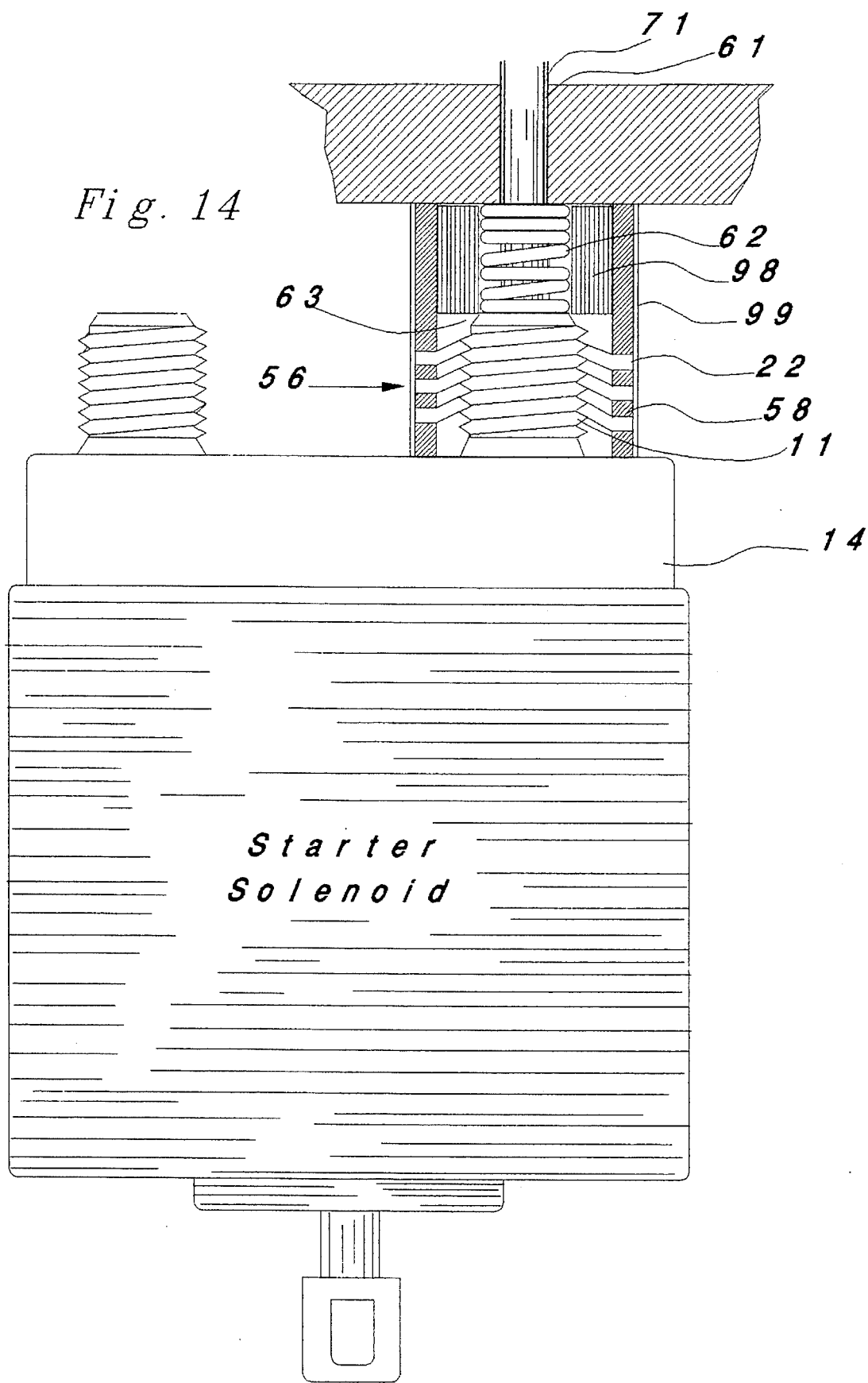

FIG. 14 A module connector assembly; detailed illustration of starter solenoid module retainer ring lock connector assembly 58. This connector assembly is attached to starter terminal connector 11, as well as retainer lock ring assemblies depicted on FIGS. 12, 13A–13D. The retainer lock ring assembly connector system, is designed to install 1 end of all connector adaptors to the starter solenoid battery terminal 11 in a manner that removal of the connector from 11, would prove difficult. The connector installs to 11, by merely pushing the connector arrangement directly onto terminal. As terminal 11 enters the cavity of the keeper, the tips of the retainer lock ring tabs 221 bend in an upward manner clicking over the threads, until the module seats firmly on 14 the starter solenoid. In this attached position, the module may not be reversed off of terminal 11, due to the tips of retainer lock ring tabs 22, locked in position in the threads of 11. This thread lock connector arrangement is permanently fixed to 11. 71, an output conductor passage through 68. 61 conductively connects to element 63, and contacts conductive element 63.62 maintains constant pressure to maintain 63 in intimate contact with 11. 98, an electrical insulator, prevents 62 from making contact with 58. 58 connector body, separating retainer lock rings 22, to provide room for the bending tabs at the tip of 22 to bend tabs upward at installation to 11, to deflect upward 99, a non-conductive insulator isolates high current from the exterior of the connector assembly.

FIG. 15 Detailed illustration of starter solenoid module and adaptor connector assembly, as depicted in FIG. 8, 57. Module connector and with general connector arrangements as depicted FIG. 11, 83, FIG. 12, 83 and FIG. 13B, 92. Refer to FIG. 8 part assembly 57, for connector assembly location. 71, an output conductor passage through 68. 61 conductively connects to element 63 and contacts conductive element. 63. 62 maintains constant pressure to maintain 63 in intimate contact with 11. 101 accepts starter solenoid terminal 11. 98, an electrical insulator, prevents 62 from making contact with 100. 99, a non-conductive insulator isolates high current from the exterior of the connector assembly.

In the following description, numerous well-known circuits are shown in block diagram form in order not to obscure the described concepts in unnecessary detail.

Referring now to FIG. 16, the microcontroller 107 includes a central processing unit (CPU) or microprocessor, read-only memory (ROM), random-access memory (RAM), power-on reset circuitry 103, timing oscillator circuitry 104, and input/output (I/O) circuitry 97, 106, 109, 112, 114, and 117. While any one of a plurality of commercially available microcontrollers may be employed, such as the 80C51 or 68HC11; in the presently preferred embodiment a commercially available microcontroller part number MC68HC705J2DW is employed.

Vehicle direct current voltage regulation and conditioning 102 is provided by well-known means. A through discussion of the power-on reset 103 and oscillator circuit 104 can be found in Motorola publication MC68HC705J2/D, 1991.

The microcontroller 107 receives data from the discreet code input means 105 located within the vehicle operator's compartment via conductor cable 106.

The vehicle ignition circuit 110, indicated by an encircled "I", provides a voltage level via conductor 119 to ignition monitor circuit 108, being a opto-coupler in the present preferred embodiment, and to one of a plurality of contacts of ignition relay 145. Output voltage level of said circuit 108 is applied to conductor 109 and read by a dedicated input port at 107.

The software program internal to 107 flashes light emitting diode 124 via conductor 97 as indication the security system is operable.

Hood switch 111 monitors hood, angular position and is read by 107 via conductor 112.

Door switch 143 monitors vehicle door position and is read by 107 via conductor 144.

Relay 113 is enabled by 107 via conductor 114 making starter solenoid circuit 115, indicated by an encircled "S", operable via conductor 120.

Alarm relay 116 and ignition relay 145 are operable via conductor 117 being operable by command of 107 in response to hood angular position change sensed by 111 or door position change sensed by 143 and processed by 107, vehicle horn 118 being active by 116 via conductor 121. 145 will disable vehicle ignition by opening a plurality of contacts at 119 and 146 of 145 thereby interrupting direct current flow to the ignition coil primary circuit.

Upon application of electrical power to 102, power-on reset 122 occurs and said microcontroller 107 performs firmware initialization 123. 107 flashes 124 indicating 107 is prepared to receive discreet code input data via subroutine 131 if 125 yields a positive result. A negative result will allow the subroutine to execute to 126. 107 monitors 111 status via subroutine 126 and tests results via subroutine 127, a negative result of which results in a program loop back to 124; a positive result of which enables 128 and loads software timer 136 with a predetermined numerical value stored within subroutine 129. Subroutine 130 tests status of 129, a negative result of said test being a loop to 128; a positive result disabling 116 and 145 via subroutine 139 and returning to 124.

In the present embodiment a keypad is utilized for element 105. When keypad 105 entry 131 is made 107 external interrupt 125 is serviced and the program reads the key value 131 and stores said value in a random access memory location 132 and increments the key input counter value by one in subroutine 133. Software timer 136 is enabled after the first key value is read. This timer value is sufficient for a vehicle owner to enter the correct code values.

Subsequent key entries must occur during the time period of 136. A time-out condition indicates an illegal entry attempt has been made and timer 136 is loaded with a larger value and 107 will not accept key entries during this period. After second, third, fourth, and fifth key entries are made and stored in memory locations of 132, the five values are compared to discreet values stored in ROM 134.

If a corresponding discreet code input occurs at 135, said light emitting diode 124 stops flashing, relay 113 is enabled by 107 subroutine 137 via conductor 114 making starter solenoid circuit 115, indicated by an encircled "S", operable via conductor 120.

Ignition circuit 110 via conductor 119 is monitored by circuit 108, element 107 subroutine 141 monitors status from 108 via conductor 109 to test engine running status by subroutine 138. If the result of this test is positive the program continues; if the result is negative, subroutine 138 returns to software timer 136, where a time-out condition occurs, and the program returns to 124.

Valet mode of operation can be entered into and exited from only when the engine is running. When said keypad 105 entry 131 is made 107 external interrupt 140 is serviced and the program reads the key value 131 and stores said value in a random access memory location 132 and increments the key input counter value by one in subroutine 133. After the second and third key entries are made and stored in memory locations of 132, the three values ate compared to discreet values stored in ROM 134.

If a corresponding discreet code input occurs at 135, said light emitting diode 124 stops flashing, relay 113 is enabled by 107 via conductor 114 making Starter solenoid circuit 115, indicated by an encircled "S", operable via conductor 120.

Ignition circuit 110 via conductor 119 is monitored by circuit 108, element 107 subroutine 141 monitors status from 108 via conductor 109 to test engine running status by subroutine 138.

After said engine has been running for a period of time, said solenoid coil circuit relay 113 is deenergized by subroutine 139, while not interfering with the status of ignition relay 145, disabling said starter solenoid coil circuit 120 to inhibit starter motor 115 operation while said engine is running to prevent said starter motor pinion gear from engagement with said engine flywheel ring sear thereby eliminating needless and costly damage to said rotating mechanical components. If subroutine 142 determines engine is stopped, program returns to 124 and loops, waiting for interrupt request 125 to be set.

What is claimed is:

1. A mechanically adaptable security module circuit housing apparatus for use in conjunction with a motor vehicle electric starter motor solenoid, comprising, in combination:

a generally cylindrical housing arrangement having housing walls comprised of an axially rotatable bearing assembly;

a structural top plate attached to said axially rotatable bearing assembly, said top plate including a plane surface, a plurality of retainer lock rings fittingly connected to an interior surface of said top plate;

a solenoid with high-current input stud bolt means mounted to said housing arrangement a plurality of electrical current conducting lock shaft assemblies mounted to and extending outwardly from said housing arrangement and connected to said solenoid high-current input stud bolt means, each said lock shaft assembly including a threaded and parallel grooved rigid shaft arrangement;

a rotatable radially adjustable terminal shaft having a compression spring and fastener means for mounting onto said solenoid high-current input stud bolt means;

a generally cylindrical weather sleeve mounted between said housing arrangement and said solenoid;

a plurality of torque-limiting fasteners affixed to certain of said threaded lock shaft assemblies for securing said housing arrangement to said lock shaft assemblies; and a plurality of locking fasteners mounted outboard of said torque-limiting fasteners.

2. The apparatus of claim 1 wherein said housing arrangement is protected by a shock absorbing protective shroud mounted thereto by radially extending compression springs and a weather boot/impact dampener.

3. A mechanically adaptable security module circuit housing apparatus for use in conjunction with a motor vehicle starter motor solenoid, comprising, in combination:

a generally cylindrical housing arrangement having housing walls comprised of an axially rotatable bearing assembly;

upper and lower conical wall means on said housing arrangement which tapers axially outwardly from a larger to a smaller periphery and is connected to said axially rotatable bearing assembly;

solenoid with high-current input stud bolt;

an electrical current conducting lock shaft assembly extending outwardly from said housing arrangement connected to said solenoid high-current input stud bolt;

a lock shaft assembly including an internally threaded keeper having a conductive element;

a compression spring;

an internal insulating ring; and an electrical conductor for said high-current input stud.

4. The apparatus of claim 3 wherein said electrical current conducting lock shaft assembly including an adaptor mechanically and electrically interfaces between said housing arrangement and said solenoid; an extension power adaptor; a lateral power adaptor; and a sheathed flexible power adaptor.

5. The apparatus of claim 3 wherein said housing walls are comprised of a generally cylindrical structural mid-section joined to a structural upper and lower conical wall which tapers axially outwardly from a larger to a smaller periphery and is rotatable axially by bearing assemblies located within an upper and lower small periphery terminus of said upper and lower conical wall; and an electrical current conducting lock shaft assembly extending outwardly from said housing arrangement and connected to said solenoid high-current input stud bolt and said lock shaft assembly consists of a plurality of interspaced retainer lock ring keepers;

a compression spring;

an internal insulating ring; and an electrical conductor element.

6. The apparatus of claim 5 wherein said electrical current conducting lock shaft assembly has an adaptor which is mechanically and electrically interconnected between said apparatus and said solenoid; an extension power adaptor; a lateral power adaptor; and a sheathed, flexible power adaptor.

* * * * *